United States Patent [19]

Roediger

[11] 4,274,959
[45] Jun. 23, 1981

[54] APPARATUS FOR DISSOLVING AIR IN WATER AND SUBSEQUENT REDUCTION OF THE WATER SURFACE TENSION IN FLOTATION SYSTEMS

[75] Inventor: Hanns E. Roediger, Stuttgart, Fed. Rep. of Germany

[73] Assignee: Techtransfer GmbH, Stuttgart, Fed. Rep. of Germany

[21] Appl. No.: 67,490

[22] Filed: Aug. 16, 1979

[30] Foreign Application Priority Data

Aug. 16, 1978 [DE] Fed. Rep. of Germany ....... 2835709

[51] Int. Cl.³ .............................................. C02F 1/24
[52] U.S. Cl. .................................. 210/221.2; 210/220; 209/170
[58] Field of Search ................. 210/44, 221 P, 221 R, 210/220; 209/164, 170; 261/DIG. 75

[56] References Cited

U.S. PATENT DOCUMENTS

| | | | |
|---|---|---|---|
| 2,793,185 | 5/1957 | Albrektsson et al. | 210/44 |
| 3,179,252 | 4/1965 | Vrablik | 210/44 |
| 3,542,675 | 11/1970 | Mail et al. | 210/44 |
| 3,966,598 | 6/1976 | Ettelt | 210/44 |

Primary Examiner—Benoît Castel
Attorney, Agent, or Firm—Sughrue, Rothwell, Mion, Zinn and Macpeak

[57] ABSTRACT

Waste water and sludge is supplied through an inlet 12 to a flotation basin 10 where a skimmer 14 collects floating solids and sweeps sunken solids into a bottom discharge trough. Water from the basin is drawn off through a line 16 and fed by pumps 18, 20 into an air pressurized container 26 through an ejector 24 which draws in and dissolves the compressed air in the water by aspiration or eduction. The air saturated water is then fed back into the basin through valves 42, 44 where the reduced pressure releases the air in the form of micro-bubbles, which reduce the surface tension of the waste water to release sludge particles and float them to the surface for skimming off.

4 Claims, 2 Drawing Figures

APPARATUS FOR DISSOLVING AIR IN WATER AND SUBSEQUENT REDUCTION OF THE WATER SURFACE TENSION IN FLOTATION SYSTEMS

BACKGROUND OF THE INVENTION

This invention relates to an apparatus for dissolving air in water and subsequently reducing the surface tension of the water in flotation systems, particularly for the treatment of waste water and sludges, whereby the air is dissolved in pressurized water which is then led out of a pressurized container to a flotation basin by means of a surface tension reducing device.

Flotation is a method by which particles of materials contained in liquids which are difficult or impossible to settle out can be separated out with the aid of extremely small air bubbles; the bubbles introduced into the liquid adhere to the particles and carry them to the surface of the liquid. Full current, partial current and return flow flotation methods are known. In the full current method the entire quantity of liquid is led into a pressurized container and the surface tension thereof is reduced after saturation. In the partial current method only a portion of the liquid quantity is enriched with air in the pressurized container and added to the remaining portion of the liquid after the surface tension reduction. According to the return flow method a portion of the discharged clean water from the flotation or other cleaned water is enriched with pressurized air and is added to the liquid to be cleaned having had its surface tension already reduced.

A flotation system with a pressurized container is known in which air is dissolved in pressurized water stored therein. The air is pressed into the feed pipe of the container by means of a compressor on the pressure side of pumps which feed the water into the container. The air-enriched water from the container travels through a surface tension reduction device into the flotation basin.

Further, a flotation system with a pressurized container is known in which pressurized water saturated with air is produced and stored. The water is delivered under pressure into the container through a pipe. The pipe opens concentrically in the narrowing portion of a venturi nozzle which is connected with the air by means of an aspiration tube. The expanding portion of the venturi nozzle is downwardly directed and ends in the lower portion of the water container. The water is drawn out through an opening in the container. At the upper portion of the container there is a pipe with a valve through which excess air not dissolved in the water is removed from the container (German OS No. 2,358,077).

SUMMARY OF THE INVENTION

According to the present invention the air to be dissolved in the pressurized container is added to flowing water from the pressurized air present in the container, and the tension reduction is undertaken at the wall of the flotation basin. No excess pressurized air is removed from the container, and only the portion of air which has dissolved into the water needs to be replaced. It is therefore possible to match the performance of the apparatus producing the pressurized air to the quantity of air removed. This arrangement also has the advantage that pipes and valves on the container for the adjustment and regulation of the discharged air are not needed. In addition, gas bubbles of extremely small diameter can be produced which may be designated as micro-bubbles, whereby even hard to remove components can be captured by the gas bubbles and transported to the surface of the flotation basin.

In an embodiment having an apparatus which regulates the water level in the container above the water inlet, the container has an aspirating ejector arranged in the area acted upon by pressurized air, to which the water for the container can be lead from the outside. The arrangement can operate intermittently without the pressure in the container causing water to flow into the air aspiration or air discharge openings which open into the chamber outside of the container. This reduces the malfunction susceptibility of the arrangement. In addition, the arrangement has a further advantage in the creation of larger contact surface areas for the air and water, which favors and accelerates the dissolving process. In this way the time necessary for the saturation of the water with air at a given pressure is reduced, whereby the size of the container necessary for the production of a certain water quantity saturated with air per time unit is smaller than known systems.

A device for regulating the water level in the container above the water inlet may be formed such that the container has an ejector with its aspiration opening in the area acted upon by pressurized air to which water can be lead from the container through an auxiliary connection by means of a pump arranged therein. This arrangement has further advantages in that the pump for the introduction of the water need only be designed for a delivery pressure which assures the water feed into the container. The pressure drop at the ejector is not included in this delivery pressure. Therefore, both the pumps as well as their drive motors can be designed for smaller performance. The delivery pump in the auxiliary connection has a delivery capacity which need only overcome the pressure drop in the conveying system and at the ejector. This pressure drop is substantially smaller than the pressure on the inside of the container. For this reason, the added expense of the delivery pump in the auxiliary connection is minimized.

Preferably the water for the container which is to be enriched with air can be taken from the cleaned discharge from the flotation basin. Because the container is not supplied with discharge water enriched in solid matter, susceptability to malfunction is reduced together with maintenance needs.

A curved diverter plate is arranged in front of the ejector opening projecting into the lower portion of the container, with the interior curve of the plate facing this opening. This achieves a better mixing of the fluid leaving the ejector with the contents of the container.

A diverter device is also arranged at a distance from the discharge opening for the tension-reduced water in the flotation basin, by means of which the current is diverted toward the liquid to be cleaned which is introduced into the flotation basin above the discharge opening. This promotes a rapid mixing between the fluid to be cleaned and the water enriched with small gas bubbles. A substantial portion of the liquid to be cleaned is therefore subjected to the gas bubbles immediately after flowing into the flotation basin and is taken thereby to the surface.

DETAILED DESCRIPTION OF THE PREFERRED EMBODIMENTS

Figure 1:
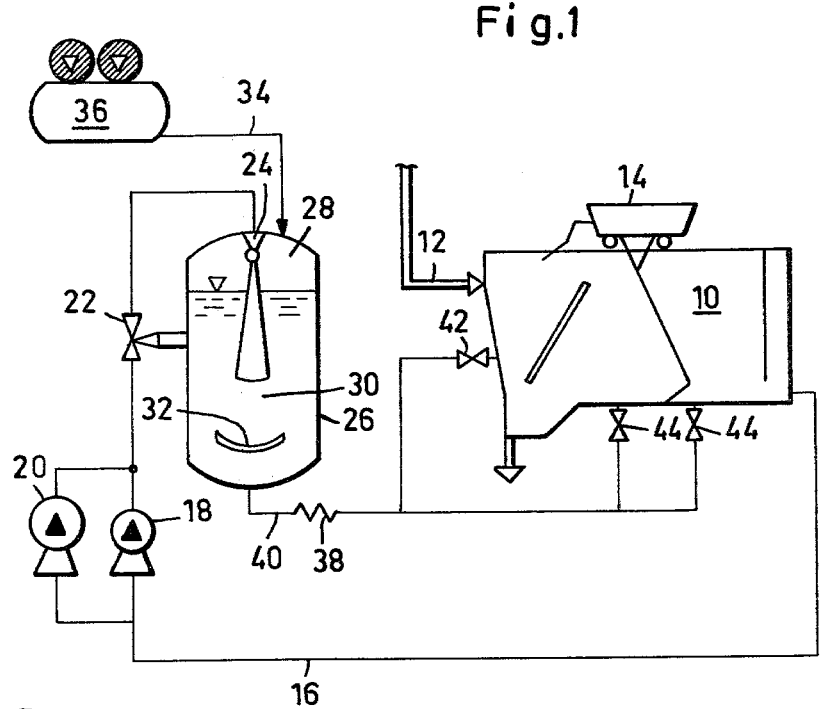
FIG. 1 shows a schematic illustration of an apparatus for dissolving air in water and subsequently reducing the surface tension of the water in a flotation system.

A flotation system, for example as used for industrial waste water, has a flotation basin 10 to which the waste water is delivered through an inlet line 12. The thick sludge appearing at the surface of the discharge water in the basin is removed by a skimmer 14. The skimmer contains sweeping shields, which are moved against the direction of flow of the water and convey the thick sludge into a trough.

The discharge water cleansed of surface sludge runs out of the basin 10 at the floor thereof behind a submersed wall. A portion of the cleansed discharge water travels through a line 16 to two pumps 18, 20, which have different delivery capacities at the same delivery rate. The two pumps 18, 20, which are connected in parallel, convey the discharge water under high pressure through a control valve 22 to an ejector 24, which is located on the interior of a pressurized container 26. The ejector 24 projects into the interior of the container 26 from the top. An upper portion 28 of the container is filled with compressed air. Water is located in the lower portion 30 of the container in which the air is dissolved. The water takes up about two thirds or more of the volume of the container. An aspiration opening of the ejector 24 is arranged in the upper portion of the container. The opening of the ejector projects into the water in the lower portion 30.

The level of the water in the container 26 is regulated to a constant level with a device including the control valve 22 as an adjusting member. This device can have a float, which follows the change in water level in the container 26. The vertical movements of the float can be transferred through a linkage to the valve 22, whereby an increase in the level causes a reduction in cross section in the valve, and vice versa.

A curved diverter 32 is arranged in the lower portion 30 of the container 26 at a distance from the opening of the ejector 24. The diverter consists of a semi-spherical plate, the inside of which is directed toward the opening. The plate diverts the flow discharged from the ejector such that the resulting currents flow upwards at the walls of the container 26, which achieves a strong swirling of the water.

A line 34 which is supplied with compressed air by a compressor 36 opens into the upper side of the container 26. The compressor regulates the compressed air in the portion 28 of the container to a constant valve.

A line 40 runs from the floor of the container to a flow measuring device 38 behind which a branch line is connected. One branch is connected with a tension reducing valve 42 which is arranged directly on one sidewall of the flotation basin 10. The outlet opening for the air-enriched water connected behind the tension reducing valve 42 is located below the inlet opening of the line 12. Further branches of the line 40 feed tension-reducing valves 44 which are arranged directly on the floor of the flotation basin. Both the valve 42 as well as the valves 44 are arranged to the inside edge of the flotation basin.

The pressurized water delivered from the pumps 18, 20 aspirates air from the chamber 28 of the container 26 lying above the water level as it passes the ejector 24. This air has its pressure regulated by the compressor 36 The pumps 18, 20 produce a water pressure of, for example, 6 bar. By the reduction of a portion of this pressure by passage through the ejector 24 the water is enriched with air from the chamber 28.

The water mixed with air bubbles travel from the ejector 24 into the portion 30 of the container 26. The water jet carries with it a multiple of the air quantity going into solution which becomes finally distributed by the current flows in the container produced by the jet. This assures high gassification of the water content in the container. In this manner an optimal dissolving of the air can take place up to saturation of the pressurized water in a very short time. The air which does not go into solution because of the saturation of the water is collected at the upper portion 28 but is not lead out of the container and remains available to the ejector 24.

The water throughput can be changed within wide bounds by means of the pumps 18, 20 whereby the saturation of the water with air is independent of the water quantity flowing through the container 26. Both pumps 18, 20 or only one of the them can be kept in operation. It is also possible to provide a pump for regular operations, while the other pump is only employed in case of a breakdown or a disruption. Furthermore, more than two pumps may also be connected in parallel.

Because only the portion of pressurized air which is dissolved in water leaves the container 26, the compressor 36 only needs to replace this amount to the container. It is therefore possible to precisely adapt the capacity of the compressor to the pressurized air consumption without any air loss. The compressor is thereby used to its optimum possibility, which increases the economy of the flotation system.

In the container 26 the water enriched dissolved air travels to the tension reducing valves 42, 44 which may for example have the form of nozzles. Because of the pressure drop gas bubbles are again formed in the water the diameter of which is very small. In part these fine gas bubbles are not formed until the water current in the flotation basin 10 leaving the tension reducing valves has already travelled a certain distance in the basin. These gas bubbles are therefore located in a zone in which a phase separation takes place, and the flotation effect is thereby increased.

The water jet leaving the tension reducing valve 42 strikes a diverter plate arranged at an angle to the horizontal. The distance between the plate 46 and the wall of the flotation basin 10 provided with the inlet opening is greater in the direction of the upper side of the basin. The upper side of the plate, however, does not extend to the plane of the liquid level of the basin. Between the shields of the skimmer 14 and the upper edge of the plate there is a certain distance which allows for a greater flow over the upper edge of the plate. The lower edge of the plate 46 is at a distance from the wall of the flotation basin which allows flow between the wall and the plate. The plate diverts the water jet leaving the tension reducing valve 42 toward the flow of discharge water entering the basin 10. A strong flotation effect therefore occurs in the area of the basin 10 adjacent the opening of the inlet line 12. An alternative diverting device can also be formed by a vertical impact plate arranged in front of the outlet of the tension reducing valve.

The tension reducing valves 42, 44 can be adjustable. The tension reduction of the water leaving the valves 42, 44 and under a pressure of for example 4 bar occurs under the influence of the counter-pressure determined by the height of the water level in the basin 10. This favors the creation of finely distributed micro-air bubbles.

The arrangement of the container 26, the pumps 18, 20, the control valve 22, the ejector 24 and the compressor 36 as illustrated in FIG. 1 is particularly suitable for water throughput quantities of from 1 to 180 cu. meters/hr. The optimal operating conditions remain independent of the throughput quantity fluctuating within these bounds. Only the delivery quantities of the pumps 18, 20 needs to be controlled for the production of the desired throughput.

Figure 2:
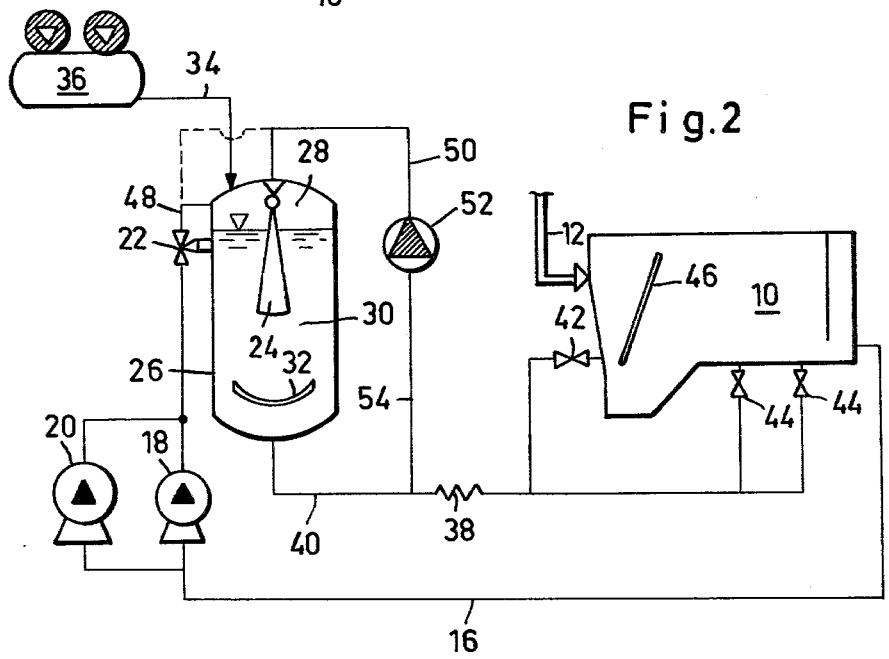
FIG. 2 shows a further embodiment of such an apparatus.

The arrangement illustrated in FIG. 2 corresponds generally to that according to FIG. 1, but the outlet of the control valve 22 is not connected to the ejector, but rather is in direct connection through a line 48 with the container 26. Preferably the line 48 opens into the upper portion 28 which is acted upon by pressurized air. The ejector 24 is fed through a line 50 from a pump 52, which is connected through aspirating line 54 with the outlet line 40 of the container 26. An auxiliary connection branch is thereby formed by the lines 50, 54 and the pump 52 in which branch the water from the container is circulated back. This water takes air from the portion 28 with it as it passes the ejector 24. The water flowing through the line 48 mixes with the water content of the container 26. The saturation of the water with air corresponding to the prevailing pressure in the container 26 is largely obtained by the circulation of a portion of the water by means of the pump 52.

To deliver water to the container 26, the pumps 18, 20 in the arrangement shown in FIG. 2 need only overcome the interior pressure of the container 26. Therefore delivery pressures of from 4 to 4.5 bar are sufficient, and weaker pumps and weaker drive motors may be used. The primary factor in determining the capacity of the pump 52, in addition to the small pressure losses in the lines 50, 54 and a portion of the container discharge line 40, is the pressure drop in the ejector 24. The operating pressure of the ejector is about 1.5 to 2 bar above the inner pressure of the container 26. The pump 52 can therefore be designed for a small pressure. It is advantageous to continuously circulate the water flow produced from the pump 52. The removed water quantity lead back to the container 26 can exceed the partial current through the lines 50, 54. Despite this, however, there is no interference with the optimal saturation of the water content of the container with air.

The arrangement shown in FIG. 2 is particularly suitable for higher water throughput quantities, for example 80 to 300 cum. mm per/hr. or more. At this level of throughput the savings which are attainable by utilizing weaker pumps and motors with regard to previous systems becomes a significant factor. The capacities of the pump drive motors can be about 30% below those or the pumps of known flotation systems of equal throughput quantities. A plurality of valves 42 can also be arranged next to each other in a row, which basically extends over the width of the flotation basin 10. A plurality of tension reducing valves 44 can also be present. It is effective to form each individual tension reducing valve 42, 44 from a shut-off valve and a nozzle, which are connected in succession. When the supply of water to the flotation basin is turned off, the shut-off valves can be closed. In this manner impure water can be prevented from passing into the pipe system running between the pressure reducing valves and the container 26.

What is claimed is:

1. An apparatus for the saturation dissolving of pressurized air in water and for thereafter discharging said air saturated water into a flotation basin containing contaminated waste water and sludge through pressure reducing valves to reduce the surface tension of the waste water and float sludge particles to the surface for skimming, said apparatus comprising:
   (a) a pressure tank (26) containing water and compressed air thereabove,
   (b) an ejector (24) having an inlet for supplying water to said tank and for simultaneously aspirating compressed air into said water being supplied,
   (c) said ejector being mounted entirely within said pressure tank and having a discharge opening disposed below the level of water in said tank,
   (d) an air aspiration opening in said ejector disposed above the level of water in said tank for the direct education of compressed air in said tank into the water being supplied by said ejector,
   (e) an upwardly curved diverter plate (32) mounted within said tank below the discharge opening of said ejector for the swirling deflection of water and aspirated air supplied thereby,
   (f) a flotation basin (10),
   (g) conduit means (16) including pressure pump and control valve means for supplying water directly from the flotation basin to the inlet of said ejector, and
   (h) a diverting device (46) mounted within the flotation basin spaced from an outlet (42) in a side wall of the basin for adding the air saturated water into the basin for deflecting said water upwardly towards an inlet (12) for waste and sludge disposed above said outlet,
   (i) said diverting device being disposed at an angle such that the distance between it and said side wall of the basin (10) increases in an upwardly direction.

2. An apparatus for the saturation dissolving of pressurized air in water and for thereafter discharging said air saturated water into a flotation basin containing contaminated waste water and sludge through pressure reducing valves to reduce the surface tension of the waste water and float sludge particles to the surface for skimming, said apparatus comprising:
   (a) a pressure tank (26) containing water and compressed air thereabove,
   (b) an ejector (24) having an inlet for supplying water to said tank and for simultaneously aspirating compressed air into said water being supplied,
   (c) said ejector being mounted entirely within said pressure tank and having a discharge opening disposed below the level of water in said tank,
   (d) an air aspiration opening in said ejector disposed above the level of water in said tank for the direct eduction of compressed air in said tank into the water being supplied by said ejector,
   (e) an upwardly curved diverter plate (32) mounted within said tank below the discharge opening of said ejector for the swirling deflection of water and aspirated air supplied thereby,
   (f) a flotation basin (10),
   (g) conduit means (16) including pressure pump and control valve means for supplying water directly from the flotation basin to said pressure tank, wherein water is directly supplied to the inlet of said ejector through an auxiliary connection (50, 54) having a pump (52) arranged therein, said water being drawn into the pump from the tank, and (h) a diverting device (46) mounted within the flotation basin spaced from an outlet (42) in a side wall of the basin for adding the air saturated water into the basin for deflecting said water upwardly towards an inlet (12) for waste and sludge disposed above said outlet, (i) said diverting device being disposed at an angle such that the distance between it and said side wall of the basin (10) increases in an upwardly direction.

3. An apparatus according to claim 1 or 2, wherein said diverter plate is semi-spherical and has a concave profile facing said discharge opening.

4. An apparatus according to claim 1 or 2, wherein there are a plurality of said outlets for adding the air saturated water into the flotation basin, each outlet comprising a pressure reducing valve consisting of a shut-off valve and a nozzle.

* * * * *